United States Patent [19]

Kopchik

[11] 4,246,374

[45] Jan. 20, 1981

[54] IMIDIZED ACRYLIC POLYMERS

[75] Inventor: Richard M. Kopchik, Southampton, Pa.

[73] Assignee: Rohm and Haas Company, Philadelphia, Pa.

[21] Appl. No.: 32,195

[22] Filed: Apr. 23, 1979

Related U.S. Application Data

[63] Continuation of Ser. No. 633,302, Nov. 19, 1975, abandoned.

[51] Int. Cl.$^3$ .............................. C08F 8/30; C08F 8/32
[52] U.S. Cl. ..................................... 525/329; 525/77; 525/80; 525/83; 525/84; 525/85; 525/242; 525/244; 525/308; 525/309; 525/310; 525/378; 525/379

[58] Field of Search ............... 525/378, 379, 329, 242, 525/244, 308, 309, 310, 77, 80, 83, 84, 85

[56] References Cited

U.S. PATENT DOCUMENTS

| | | | |
|---|---|---|---|
| 2,146,209 | 2/1939 | Graves | 260/72 R |
| 3,244,679 | 4/1966 | Schroder et al. | 526/49 |
| 3,284,425 | 11/1966 | Schroder et al. | 526/49 |
| 3,415,904 | 12/1967 | Taniguchi et al. | 526/50 |
| 3,627,711 | 12/1971 | Schroder et al. | 526/49 |
| 3,776,976 | 12/1973 | Volker et al. | 526/49 |
| 4,169,924 | 10/1979 | Barabas et al. | 525/378 |

*Primary Examiner*—William F. Hamrock
*Attorney, Agent, or Firm*—Michael B. Fein

[57] ABSTRACT

Polymers containing imide units and a process of imidizing acrylic polymers to any desired degree of imidization without the use of added water or solvent.

40 Claims, No Drawings

IMIDIZED ACRYLIC POLYMERS

This is a continuation of application Ser. No. 633,302 filed Nov. 19, 1975 now abandoned.

BACKGROUND OF THE INVENTION

I. Field of the Invention

This invention relates to novel imide polymers and to methods for preparation thereof.

II. Description of the Prior Art

The basic reaction of formation of imides by reacting ammonia, butylamine, dodecyl amine or octyl amine with polymethyl methacrylate is shown in Graves U.S. Pat. No. 2,146,209, German Pat. No. 1,077,872 and German Pat. No. 1,242,369. Schroder et al U.S. Pat. No. 3,284,425 and British Pat. No. 926,629 show a route toward imidized acrylics by reacting polymethyl methacrylate with ammonium hydroxide, ammonium phosphate, alkyl amines or a combination of partial reaction with ammonium hydroxide followed by reaction with alkyl amine. British Pat. No. 1,045,229 shows chemical modification of methacrylic acid/methacrylonitrile (MMA/MAN) copolymers or terpolymers by heating at 180°–300° C. to give the cyclic amide product, optionally with a dispersing solvent. German Pat. Nos. 1,247,517; 2,041,736; and 2,047,096 show methacrylamide/methyl methacrylate (MAN/MMA) copolymers, inert solvent, and heat to achieve imide formation accompanied by evolution of ammonia. Most prior patents and literature on processes to imidized acrylics via reaction of ammonia and primary amines with polymethyl methacrylates, U.S. Pat. No. 3,284,425 for example, are directed to an autoclave batch process requiring lengthy heating time, usually 7 hours or more, in the presence of inert dissolving or suspending solvent. U.S. Pat. No. 3,557,070 describes a process for preparing ethylene/methacrylic acid/methacrylamide terpolymers from an ethyleneisopropyl methacrylate copolymer by heating the copolymer to the decomposition temperature (325° C.) of the isopropyl ester to form methacrylic anhydride units which are then reacted with gaseous ammonia to give methacrylamide and methacrylic acid residues in the polymer chain. The reaction is run neat without solvent and the patent examples mention decomposition "zones". Although this patent does not mention that these reactions are taking place in an extruder, the Derwent abstract of this patent mentioned that these reactions may be run in an extruder. The use of extruders as polymer reactors has been shown as a route to copolyesters (Preparation and Properties of Copolyesters Polymerized in a Vented Extruder, J. Applied Polymer Science 12,2403[1968], nylon products (Direct Extrusion of Nylon product from Lactams, Modern Plastics, August 1969—Warner Pfleiderer) and graft polymerization of polyolefins (Steinkamp et al U.S. Pat. No. 3,862,265). West German Pat. No. 1,077,872 discloses an extruder process of imidizing acrylic polymers using a water solution of ammonia, but the product is a foamed strand with deficient thermal stability and which requires further processing before it can be used to fabricate useful items; furthermore, the process described is not commercially feasible in that the foamed polymer exits the extruder under high pressure with free ammonia vapor.

It is an object of the present invention to provide a process for imidization of acrylic polymers at low residence times. It is a further object to provide a process for imidization of acrylic polymers without substantial molecular weight degradation and wherein the polymers produced have a high, uniform molecular weight and are non-crosslinked and thermoplastic, and have improved thermal stability. A further object is to provide a process wherein less than substantially complete imidization of acrylic polymers is possible, especially to produce uniformly imidized polymers.

Another object is to provide novel imidized acrylic polymers. A still further object is to provide an improved process for producing imide polymers with improved properties, free of the disadvantages of prior processes.

SUMMARY OF THE INVENTION

These objects and others as will become apparent from the following disclosure are achieved by the present invention which comprises in one aspect a process for producing a polymer containing imide units comprising reacting an acrylic polymer with anhydrous ammonia or an anhydrous primary amine in an extruder, without added water or solvent, and applying subatmospheric pressure to at least one vent port.

The polymer product containing imide units produced by this product is another aspect of this invention. The thermoplastic polymer, part of the invention, contains imide units of the structural formula

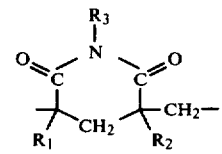

wherein $R_1$, $R_2$, and $R_3$ independently represent hydrogen or unsubstituted or substituted $C_1$ to $C_{20}$ alkyl, aryl, or aralkyl alkaryl, or mixtures thereof, said polymer further characterized as non-crosslinked and soluble in dimethyl formamide, and having a degree of thermal stability as measured by TGA such that the temperature at which said polymer has 1% decomposition in air is above 285° C.

Dynamic thermogravimetric analysis, (TGA), as used in this specification, is a standard test conducted with a programmed temperature increase rate of 20° C./min. in either an air or a nitrogen atmosphere on a du Pont thermogravimetric analyzer in combination with a differential thermal analyzer as described in du Pont Instrument Products Division Preliminary Product Bulletin 950-1 (A-36177).

DETAILED DESCRIPTION

The acrylic polymer is any polymer containing units derived from esters of acrylic or methacrylic acid. The polymer can be single or multiple stage, but in the latter case the outer or final stage must contain units derived from acrylic or methacrylic acid since it is believed that the imidization reaction takes place mainly in this stage. While any such acrylic or methacrylic acid esters can comprise the acrylic polymer, and can comprise any amount of the polymer, generally at least 25 percent by weight, preferably at least about 50 percent by weight, more preferably above about 80 percent, and most preferably about 95 to 100 percent by weight of the acrylic polymer is of said esters. Preferred are the species wherein the ester moiety contains 1 to 20 carbon atoms, most preferably methyl methacrylate (MMA) due to its lower cost and availability. Polymers of monomer systems comprised of at least 80 percent by weight MMA are very suitable. The acrylic polymer can contain units derived from other ethylenically unsaturated monomers such as styrene, acrylonitrile, and even such monomers as butadiene. The acrylic polymer can be a single state polymer or can be a multiple stage polymer such as a core-shell polymer or a graft polymer, with varying degrees of grafting between stages.

The acrylic polymer can be of a wide range of molecular weights. Since commercially available acrylic polymers range in intrinsic viscosities, $[\eta]_{DMF}$, of about 0.01 and below to about 7.0 and above, these are of course preferred. Acrylic polymers having an $[\eta]_{DMF}$ of about 0.28 to 2.0 are most preferred.

Frequently the starting materials will comprise a single stage polymer dry or melt blended with a multiple stage impact modifier polymer, in which case the single stage polymer and primarily the outer stage of the multiple stage polymer are imidized. Such blends are more compatible than blends of the imidized single stage polymer with the same multiple stage polymer, especially when the latter is not imidized. Preferred are blends of single stage acrylic polymers with about 10 to 60% by weight multiple stage polymer.

The acrylic polymer can be in any form, but is generally in molding powder or granule form, and can be colorless or colored, but in some cases the imidization process affects the dyes or pigments, in which case the coloring agent is incorporated after processing.

The ammonia or primary amine is a compound of the formula $R_3NH_2$ wherein $R_3$ is hydrogen or substituted or unsubstituted alkyl or aryl having up to 20 carbon atoms.

The substantially anhydrous ammonia or primary amine, or mixtures thereof, is introduced to the reaction zone in gaseous or liquid form under pressure, but in the case of primary amines can optionally be introduced in solid form. Due to ready availability, ammonia and methylamine are most preferred of the compounds of the formula $R_3NH_2$, but others work very well in the process also, and also give very desirable products. Other suitable amines include, for example, ethyl, n-propyl, n-butyl, heptyl, hexyl, octyl, nonyl, decyl, dodecyl, hexadecyl, octadecyl, isobutyl, sec-butyl, t-butyl, isopropyl, 2-ethyl hexyl, phenethyl, allyl, alanine, benzyl, parachloro benzyl, and dimethoxy phenethyl amines; alanine; glycine; 3'-aminoacetophenone; 2-aminoanthraquinone; and p-aminobenzoic acid. Also cyclohexyl amine, 2-amino-4,6-dimethyl pyridine, 3-amino phthalimide, 2-aminopyrimidine, 2-aminopyridine, 2-aminothiazole. 5-amino-1-H-tetrazole, aniline, bromoaniline, dibromoaniline, tribromoaniline, chloroaniline, dichloroaniline, trichloroaniline, p-phenetidine, an p-toluidine are suitable. It is important that little or no water be introduced with the ammonia or primary amine, never more than about 2 percent by weight, preferably less than 1 percent, water based on ammonia or primary amine. For purposes of this invention, the term substantially anhydrous is defined by the aforementioned maximum water contents.

In accordance with the process aspect of the invention, the acrylic polymer is continuously fed to an extruder, and the ammonia or primary amine is introduced continuously at the same time, usually through an injection port. Unwanted by-products and excess ammonia or primary amine are removed by progressively reducing the pressure at downstream extruder vents, with at least one downstream vent at vacuum (subatmospheric pressure). Sometimes only one vent under vacuum is all that is necessary to adequately remove all by-products and unreacted ammonia or primary amine.

The temperature in the extruder can be varied, depending on the nature of the starting materials, pressure, residence time, etc., but is especially dependent on the melt viscosity of the polymer being extruded. Usually, about 300° to 375° C. is suitable, but about 200° to 450° C. would generally be the outer limits of the internal temperature of the extruder. Different sections of the extruder-reactor can be maintained at different temperatures.

As high a pressure as possible is preferred, but again the pressure most suitable depends on other factors such as equipment limitations and the like. As low as atmospheric is operable, and as high as 1000 atmospheres is possible. In most embodiments, below 500 atmospheres pressure is suitable. When the primary amine is introduced in solid form, it can be introduced as a dry blend with the acrylic polymer rather than through a separate addition port.

The reaction time (or average residence time in the reaction zone) is about 0.1 to 1000 seconds, preferably about 30 to 300 seconds.

The degree of imidization of the acrylic polymer is readily controllable in my process, and different degrees are chosen for different properties desired in the final product. The desired degree is consistently achievable by adjustment of the reaction parameters such as residence time. Although as low as 1% imidization can be achieved, at least 10% is usually needed for noticeable property improvement of the acrylic polymers. Up to about 100% imidization can readily be achieved by the process, meaning essentially all of the ester moieties of the acrylic polymer are converted to glutarimide moieties.

No catalyst is necessary in the process. This results in the great advantage of eliminating the necessity of catalyst removal. Small amounts of catalyst conceivably increase production rates, however.

No solvent is necessary, and it is preferred not to use it.

The product exits the extruder in melt form, at which point other additives such as fibers, colors, flame retardants and the like can be incorporated. Optionally, additives such as, for example, impact modifiers, pigments, fibers, stabilizers, lubricants, etc. can be added with the acrylic polymer prior to introduction in the reactor. The product can then be allowed to solidify in any desired form, e.g., sheet, tube, film, rod, or strand, and the solidified product can be chopped into powder or granule form as desired.

Impact modifiers of the ABS (acrylonitrile/butadiene/styrene), MBS (methyl methacrylate/butadiene/styrene) and all acrylic type have been found to be useful for improving the impact strength of the imide polymers while retaining high service temperature. The ratio of impact modifier to imide polymer can be varied over a wide range, depending upon how much impact modification is needed for the particulate application. Ratios of impact modifier to imide polymer of from about 1:99 to about 70:30 are useful, with the preferred range being about 5:95 to 60:40. Impact modifiers can be single or multiple stage polymers. In the case of multiple stage polymers, the impact modifier can have a hard or soft first or "core" stage followed by stages varying in hardness or softness. Exemplary impact modifiers are those disclosed in U.S. Patent Application Ser. No. 588,544 of June 19, 1975 entitled MBS Graft Polymers and Process for their Production, and U.S. Pat. No. 3,808,180 of Apr. 30, 1974.

From about 0.1 to about 25 percent by weight flame retardant can be employed, preferably compounds of bromine, chlorine, antimony, phosphorus aluminum trihydrate, certain organic compounds containing two or more hydroxyl groups, or mixtures thereof. More specific examples of flame retardants are triphenyl phosphate, phosphonium bromide, phosphonium oxide, tris (di-bromo propyl) phosphate, cycloaliphatic chlorides, chlorinated polyethylene, antimony oxide, ammonium polyphosphate, decabromo-diphenyl ether and chlorinated polyphosphonate. The high service temperature of the polyphosphonate. The high service temperature of the poly (glutarimide) in its base resin permits larger amounts of fire retardants to be added than can be added to other base resins, while yet maintaining acceptable service temperature.

A wide variety of fillers can be employed, at filler levels of from about 5 to 80 percent. Surprisingly large amounts of filler such as hydrated alumina can be blended with the glutaramide polymer base resin, up to about 60 to 70 percent, while maintaining thermoformability. On the other hand, most thermoplastic systems cannot accept more than about 40 percent inert filler with retention of thermoformability. The novel imide polymers can be blended with glass reinforcement at glass levels of about 1 to 60 percent to enhance strength, stiffness, creep resistance and deformation resistance at high temperatures and to reduce the thermal expansion co-efficient. The compatibility of the glass reinforcement with the novel imide polymers is unusally high and frequently permits the use of glass reinforcement which has standard coupling agents rather than specially prepared reinforcements.

If desired, the novel imide polymers can be foamed. A variety of methods of foaming can be used, for example chemical blowing agents can be mixed with the imide polymer and fed to an injection molding machine which plasticizes the polymer and decomposes the blowing agent under pressure in the cylinder of the injection molding machine with subsequent rapid feeding to the cavity of the mold. Articles of variable density, for example, about 0.4 to 1.2 g/cc, can be obtained. Such foamed parts have advantages of rigidity, design freedom, acoustic dampening, and corrosion resistance. In other embodiments, glass fibers can be added along with a chemical blowing agent so as to produce a foamed, strong, heat resistant part with an asthetically appealing surface and excellent chemical and stain resistance. Also, fillers such as, for example, alumina trihydrate can be included with chemical blowing agent and, for example, extruded into flat sheet having a variety of desirable properties such as lower density, good flexural modulus and flame resistance.

The extruder is preferably multiple screw type, for example a twin screw tangential counter-rotating extruder or a twin screw intermeshing co-rotating extruder.

The product of the process is novel, and has properties not possible with previous imide polymers, more specifically high tensile and flexural strength, solvent and hydrolysis resistance, thermal stability, high service temperature, good optical properties, weatherability, barrier properties, and others.

The polymers of the invention are non-crosslinked, and this is evidenced by solubility in dimethyl formamide (DMF).

The uniformity of molecular weight and imide content of my polymers is a particularly desirable property of the polymers of the invention, and was not achievable in prior processes. More specifically, most of the polymer molecules have the same imide content, and so the compositions have a narrow, controlled composition distribution.

The molecular weight of these compositions is the same as or very close to that of the starting acrylic polymer, which is also a great advantage as contrasted with prior processes in which molecular weight degradation occurred.

Chemically, the compositions comprise a thermoplastic polymer containing imide units of the structural formula

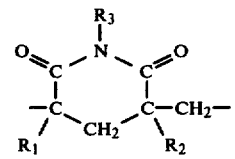

wherein $R_1$, $R_2$ and $R_3$ independently represent hydrogen or $C_1$ to $C_{20}$ unsubstituted or substituted alkyl, aryl, alkaryl, or aralkyl, $R_1$ and $R_2$ being derived from the acrylic or methacrylic acid esters, and the $R_3$ from the ammonia or primary amine or mixtures thereof.

In the cases of 100% imidized polymers, the glutarimide structure is essentially the only repeating unit, but in the case of lower degrees of imidization, in addition to the glutarimide units, acrylic units of the formula

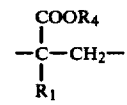

wherein $R_4$ is lower alkyl or other radicals derived from the ester moiety of the acrylic unit will be present.

When acrylic units are present, the ratio of imide units to acrylic units is usually from about 1:9 to about 9:1, preferably about 3:4 to 4:3.

The ammonia-derived imides are most preferred, and so $R_3$ is preferably hydrogen. The acrylic polymer is preferably a homopolymer of methyl methacrylate.

The polymers of this invention have utility as molding powders, pellets or granules for use in making molded articles such as tail light lenses, toys, watch crystals, to name but a few examples. Also, the polymer can be in the form of sheet, rod, tube, and the like.

The compositions of the invention can also be used as oil additives due to good viscosity characteristics, not adding to viscosity at low temperatures but thickening oil at higher temperatures.

The imide polymers of this invention do not have any significant odor when prepared under the preferred conditions, and can be processed by injection molding, extruding, milling, or any other polymer processing procedure without odor of degradation. Even at temperatures of over 400° C., no polymeric decompositions so as to give off ammonia or amine takes place.

The thermal stability of the polymers of the invention is one of the distinguishing advantages of the materials as compared to analogous prior polymers. With thermogravimetric analysis, TGA, as the test method, the polymers of the invention have a degree of thermal stability wherein the temperature at which the polymers have a 1% weight loss is above 285° C. in air and above 300° C. in nitrogen.

To illustrate the invention, the following non-limiting examples are presented. All parts and percentages are by weight unless otherwise indicated.

The following abbreviations are used:

| p—  | polymer of—         |
|-----|---------------------|
| MMA | methyl methacrylate |
| EMA | ethyl methacrylate  |
| EA  | ethyl acrylate      |
| BA  | butyl acrylate      |
| MA  | methyl acrylate     |
| AA  | acrylic acid        |
| MAN | methacrylonitrile   |
| E   | ethylene            |
| VA  | vinyl acetate       |
| DMF | dimethyl formamide  |
| MDC | methylene dichloride |

EXAMPLES 1 TO 45

In a twin screw counter-rotating extruder set up with a feed port for introducing acrylic polymer in solid form such as granule, pellet, or powder, an addition port for introducing ammonia or primary amine at elevated pressure, an extruder barrel heated or cooled with oil in five separate zones, each about 84 cm., a die which serves as the exit port for the polymer product, and a vent port operated under vacuum and located in the last zone, acrylic polymer as specified in Table I is introduced via the feed port.

Amine or ammonia reagent, as specified in Table I, is introduced in the extruder barrel just after a non-flighted screw section (compounder) which forms a vapor seal which keeps the reagent from going back toward the polymer feed port. The reagent contacts and mixes with the polymer as it moves forward through the reaction zone, under pressure as specified in Table I. The unreacted reagent as well as the volatile products and by-products of the reactor are removed under vacuum at the vent. The imidized polymer product leaves the extruder through the die in melt form, non-foamed, and essentially free of volatile materials.

The extruder used for examples 7 to 21 and 27 to 45 includes two additional vents, the first being a vent upon which a high pressure is maintained by means of a restrictive valve on the vent, the second being at atmospheric pressure, said vents being located after the amine introduction port but before the vacuum vent which is at the negative pressure specified in Table I.

The extruder used for examples 22 to 26 is the same as for examples 7 to 21 and 27 to 45 except that it includes third and fourth additional vents, located before the amine introduction ports, the third being at atmospheric pressure and the fourth being at vacuum.

In Table I, the degree of imidization is indicated by % nitrogen (%N), and the following base polymers are used:

A. pMMA of $[\eta]_{DMF}$ of 1.15.
B. p(MMA/EA), in a weight ratio of 96/4 in the polymer, and of $[\eta]_{DMF}=0.80$.
C. p(MMA/EA), 96.4, and of $[\eta]_{DMF}=0.55$.
D. PMMA of $[\eta]_{DMF}=1.35$.
E. pMMA $[\eta]_{DMF}=0.80$.
F. p(MMA/EA), (95/15), $[\eta]_{DMF}=1.65$.
G. A syrup of 50% A and 50% MMA monomer.
H. A syrup of 60% B with 40% of a monomer mixtures of MMA and EA in a ratio of 85/15.
I. pMMA of $[\eta]_{DMF}=2.7$.
J. p(EMA/BA/MA), 75/25/25 and $[\eta]_{DMF}=0.51$.
K. p(MMA/BA), 50/50, $[\eta]_{DMF}=0.80$.
L. p(MMA/AA), 95/5, $[\eta]_{DMF}=1.05$.
M. p(MMA/MAN), 90/10. $[\eta]_{DMF}=0.70$.
N. p(MMA/MAN), 98/2 and $[\eta]_{DMF}=1.35$.
O. p(MMA/VA), 80/20, $[\eta]_{DMF}=0.51$.
P. p(MMA/E), 75/25, $[\eta]_{MDC}=0.45$.
Q. p(MMA/E), 75/25, $[\eta]_{MDC}=0.57$.
R. (pMMA), $[\eta]_{DMF}=1.05$.
S. p(MMA/EA), 50/50, of $[\eta]_{DMF}=0.64$.
T. pMA, $[\eta]_{DMF}=3.0$.
U. p(MMA/E), 80/20, $[\eta]_{MDC}=1.0$.
V. pMMA, $[\eta]_{DMF}=0.64$.
W. p(MMA/BA), 95/5, $[\eta]_{DMF}=0.76$.
X. 50/50 Blend of I and V.

In certain examples, the product produced in a different example is introduced as feed; this is indicated by entry in the Table of that example number under "feed".

TABLE 1

| EX. NO. | FEED | POLYMER RATE g/min. | AMINE TYPE | AMINE RATE g/min. | AMINE PRESSURE atm. | EXTRUDER RPM | AVERAGE BARREL TEMP. °C. | PRESSURE IN VACUUM VENT atm. | PRODUCT DATA % N | VICAT °C. |
|---|---|---|---|---|---|---|---|---|---|---|
| 1 | G | 27 | Ammonia | 7 | 29.9 | 150 | 310 | 0.16 | 1.47 | 134 |
| 2 | 1 | 31 | " | 7 | 35.4 | 150 | 310 | 0.16 | 3.19 | 152 |
| 3 | 2 | 26 | " | 7 | 50.4 | 150 | 310 | 0.16 | 5.59 | 190 |
| 4 | A | 23 | " | 8 | 49.7 | 150 | 310 | 0.23 | 3.26 | 157 |
| 5 | 4 | 32 | " | 8 | 61.2 | 150 | 310 | 0.26 | 6.57 | 188 |
| 6 | B | 31 | " | 6 | 23.8 | 150 | 310 | 0.16 | 0.74 | 130 |

| EX. NO. | FEED | POLYMER RATE g/min. | AMINE TYPE | AMINE RATE g/min. | AMINE PRESSURE Psig | EXTRUDER RPM | AVERAGE BARREL TEMP. °C. | PRESSURE VACUUM VENT atm. | PRODUCT DATA % N | VICAT |
|---|---|---|---|---|---|---|---|---|---|---|
| 7 | C | 67 | Methyl | 8 | 360 | 300 | 260 | 0.10 | 1.22 | |
| 8 | 7 | 70 | " | 8 | 370 | 300 | 260 | 0.16 | 2.86 | |
| 9 | 8 | 62 | " | 8 | 370 | 300 | 260 | 0.16 | 5.06 | |
| 10 | B | 50 | " | 10 | 175 | 360 | 280 | 0.16 | 3.55 | 126 |
| 11 | B | 49 | " | 13 | 450 | 315 | 280 | 0.16 | 5.32 | 142 |
| 12 | B | 47 | " | 30 | 450 | 315 | 280 | 0.16 | 6.81 | 154 |
| 13 | B | 46 | " | 34 | 650 | 310 | 280 | 0.16 | 7.20 | 161 |
| 14 | B | 18 | " | 12 | 700 | 315 | 280 | 0.16 | 8.00 | 182 |

TABLE 1-continued

| | | | | | | | | | | |
|---|---|---|---|---|---|---|---|---|---|---|
| 15 | B | 25 | " | 17 | 670 | 312 | 280 | 0.16 | 8.20 | 183 |
| 16 | B | 25 | Ammonia | 7 | 740 | 315 | 300 | 0.13 | 5.01 | 164 |
| 17 | D | 28 | " | 7 | 850 | 315 | 310 | 0.20 | 7.54 | 199 |
| 18 | D | 23 | " | 11 | 775 | 365 | 310 | 0.23 | 7.63 | 200 |
| 19 | D | 58 | " | 5 | 775 | 450 | 310 | 0.13 | 4.44 | 160 |
| 20 | D | 59 | " | 3 | 725 | 450 | 310 | 0.13 | 2.18 | 141 |
| 21 | D | 46 | " | 6 | 825 | 455 | 310 | 0.10 | 5.58 | 171 |

| EX. NO. | FEED | POLYMER RATE g/min. | AMINE TYPE | AMINE RATE g/min. | AMINE PRESSURE atm. | EXTRUDER RPM | AVERAGE BARREL TEMP. °C. | PRESSURE IN VACUUM VENT atm. | PRODUCT DATA | |
|---|---|---|---|---|---|---|---|---|---|---|
| | | | | | | | | | % N | VICAT °C. |
| 22 | E | 50 | Ammonia | 10 | 53.8 | 350 | 310 | 0.10 | 3.2 | 155 |
| 23 | E | 50 | Methyl | 8 | 34.0 | 250 | 310 | 0.10 | 7.1 | 160 |
| 24 | E | 50 | Cyclohexyl | 15 | 20.4 | 275 | 310 | 0.10 | 6.8 | 165 |
| 25 | F | 48 | Ammonia | 12 | 55.1 | 200 | 310 | 0.10 | 3.3 | 160 |
| 26 | F | 48 | Methyl | 10 | 34.7 | 200 | 310 | 0.10 | 7.0 | 158 |

| EX. NO. | FEED | POLYMER RATE g/min. | AMINE | AMINE RATE g/min. | EXTRUDER RPM | AVERAGE BARREL TEMP. °C. |
|---|---|---|---|---|---|---|
| 27 | I | 50 | Ammonia | 5 | 250 | 300 |
| 28 | J | 25 | Methyl | 2 | 150 | 250 |
| 29 | K | 100 | Ammonia | 10 | 400 | 310 |
| 30 | L | 35 | Methyl | 5 | 200 | 275 |
| 31 | M | 60 | Ammonia | 10 | 200 | 290 |
| 32 | N | 40 | Methyl | 3 | 175 | 310 |
| 33 | O | 80 | Ammonia | 7 | 350 | 250 |
| 34 | P | 30 | Methyl | 2 | 250 | 310 |
| 35 | Q | 50 | Ammonia | 5 | 275 | 275 |
| 36 | R | 100 | Dodecyl | 30 | 300 | 250 |
| 37 | S | 60 | Aniline | 10 | 310 | 310 |
| 38 | T | 30 | N-vinyl | 7 | 200 | 260 |
| 39 | U | 40 | Cyclohexyl | 15 | 275 | 275 |
| 40 | V | 100 | Isopropyl | 30 | 400 | 290 |
| 41 | W | 50 | N-butyl | 15 | 300 | 265 |
| 42 | S | 35 | Ethyl | 7 | 250 | 310 |
| 43 | S | 25 | Trichloro-analine | 15 | 150 | 310 |
| 44 | X | 50 | Ammonia | 12 | 275 | 310 |
| 45 | R | 50 | A blend of 5% ammonia 95% butylamine | 25 | 300 | 300 |

EXAMPLE 46

In an extruder reactor as used in Examples 1 to 45 except with a configuration:polymer feed/high pressure vent/amine feed/atmospheric vent/vacuum vent/exit die, base polymer A is imidized under the same conditions as Example 7 resulting in a nitrogen content of 1.5% and bonds in its IR spectra indicating the formation of imide groups.

EXAMPLE 47

2724 Kg/hr. of a copolymer of 70/30 MMA/EA with a $[\eta]DMF=2.7$ are fed to the feed throat of a twin screw counter-rotating tangential extruder with a screw diameter of 51.4 cm. The polymer is conveyed down the barrel, fluxed, and then passed through a restrictive section which acts as a pressure seal. In a section of extruder barrel, 15 barrel diameters long, which is isolated with regard to gas transfer from the rest of the extruder, ammonia is added at the rate of 272.4 kg/hr. The ammonia is added to the down stream port of the reaction zone and the unreacted ammonia and reaction products exit the reaction zone on the up stream end of the reaction zone. The vapor stream is thus counter-current to the polymer stream. The pressure in the reaction zone is kept at 33.42 atmospheres.

The polymer passes from the reaction zone to a vent zone, at atmospheric pressure; at this zone most of the remaining methanol and ammonia are removed. The polymer is then conveyed into a vent zone operated under reduced pressure to aid in the removal of the last traces of ammonia and methanol. The polymer then leaves the extruder through a die containing many holes. The many strands thus formed are cut to give 2084 kg/hr. of the final product. The product has a nitrogen content of 9.0% and a Vicat softening point of 200° C. It is insoluble in boiling water and not attacked by mild acids or bases. The molecular weight of the product is within 10% of that of the starting polymer.

EXAMPLE 48

To an extruder, as described in Example 47, a copolymer of 96% methyl methacrylate with 4% ethyl acrylate with $[\eta]_{DMF}$ of 0.84 is introduced at 1430 kg/hr. This polymer is compacted, melted, and formed into a continuous stream of molten plastic which is propelled along in the extruder barrel. Through the use of non-flighted and reverse-flighted screw sections the extruder is divided into zones through which the polymer can flow but vapors can not pass; pressure differentials of over 68 atm. can be established between zones without vapor transport between them. To the "reaction" zone of this extruder is added 738 kg/hr. of anhydrous monomethyl amine; this material is a gas under the condition of the extrusion operation. The monomethyl amine gas and the polymer melt are caused to come into intimate contact by having several intensive mixing screw sections in the reaction zone. Some of the amine dissolves in the polymer melt. The dissolved amine the reacts with the ester units in the polymer to displace methanol and to form six membered cyclic imide rings attached to the polymer backbone. The excess amine and the methanol reaction product in the vapor phase are removed from the extruder at a vent located at the end of the reaction zone. A pressure regulation valve at this vent estabilishes a pressure of 44 atm. within the reaction zone. The polymer melt, which contains dissolved monomethyl amine and methanol, is propelled into a vent zone operated at atmospheric pressure. In this zone most of the dissolved amine and methanol is removed. The polymer next passes into a vent zone under a pressure of 0.06 atm. In the zone the remainder of the dissolved amine and alcohol are removed. The polymer melt, now free of volatile materials is forced through a die to form many strands of polymer which extrude from the machine. These strands are continuously cooled and cut to give 1195 kg/hr. of the product polymer in molding powder form. The extruder is heated to keep the barrel temperature in all zones at 280° C., except the initial feed zone which is kept at 150° C. The materials collected from the three vents are processed in such a way to recover most of the monomethyl amine in a pure form for recycle to the reaction zone, and a solution of methanol with some monomethyl amine in it. There are several commercial uses for such a solution, such as in the production of monoethyl amine by the reaction of ammonia with methanol.

The polymer produced by this process has a $[\eta]_{DMF}=0.76$. The reduction in molecular weight upon imidization is due to the loss of weight due to the chemical transformation of the side chains and not to any significant reduction in the length of the polymer backbone.

This polymer has a Vicat softening point of 182° C. measured in accordance with ASTM D1 525-70. It is clear and colorless and can be processed by all the normal techniques used to prepare useful articles from thermoplastic materials. The polymer has a Charpy unnotched Impact Strength of 7.5 ft.-lbs. measured in accordance with ASTM D-256-56.

EXAMPLE 49

50 g/min. of pMMA is added to a Werner Pfleiderer twin screw intermeshing extruder type ZDS-L 28. To an injection port near the feed end of this extruder 10 g/min. of methylamine is added at 170 atm. The unreacted methylamine and volatile products are removed from the extruder at a vacuum vent near the die end of the extruder. The resulting polymer has a nitrogen content of 8.4% and gives an IR spectra which shows that the polymer is essentially all imide.

EXAMPLE 50

50 g/min. of pMMA is added to a 1" Killion single screw extruder. To this extruder ammonia is added at 8 g/min. at an inlet port near the feed end of the extruder. The unreacted ammonia and reaction products are removed at a vacuum vent near the front end of the machine. The resulting product is a clear colorless polymer soluble in DMF.

EXAMPLE 51-(Comparative)

A. Attempted repeat of Example 7 of West German Pat. No. DAS 1,077,872.

As in the reference, an aqueous ammonia ($NH_3/H_2O$ ratio of 80/20 by wt.) solution was introduced through a vent plug of a single screw at a rate of 5 cc/min. to a 40 g/min. feed of pMMA ($\eta$ SP/C of 0.5). The extruder was a 1" Killion with an l/d of 24/1 and a ½"×2" vent port located 60% of the way from the feed to the die, the vent being equipped with a plug with an inlet port which was, in turn, connected by a steel line to a LAPP LS-5 pump which, in turn, was connected to a feed cylinder. The extruder was run at 100 RPM with a barrel temperature of 265° C.

With a first screw having a channel width reduction from 0.255 to 0.110 (going from vent area to die), the highest ammonia pressure obtainable was 15 atm. since the pressure seemed to be venting through the die. Attempting to achieve the pressure specified in the reference: (a) the polymer feed rate was increased to 70 g/min., but the ammonia pressure remained at 15 atm.; (b) the ammonia rate was increased to 11 cc/min. with resultant ammonia pressure increase to 20 atm., but the pressure still seemed to be venting through the die.

Attempting to achieve the pressure conditions reported in the reference, a second screw, having a channel width reduction of 0.200 to 0.050, a screen pack, and an ammonia rate of 5 cc/min. were used, but again only 15 atm. ammonia pressure could be obtained since the pressure seemed to vent through the polymer feed port. However, the die pressure was 50 atm. leading one to believe that this is where pressure was measured in the reference. The pMMA had to be force fed to keep the system running. The ammonia rate was increased to 10 cc/min. but the pressure did not increase.

No imidization was observed in any of these attempts to repeat Example 7 of the reference.

EXAMPLE 52-(Comparative)

A. In accordance with the invention, an 0.8" Welding Engineer's twin screw extruder having the configuration described in Examples 1-6 is used to completely imidize a pMMA having a [$\eta$]DMF of 1.65 with non-aqueous ammonia under a pressure of 53 atm. and temperature of 260°-270° C. at a point about ⅛ the way down the screw. A vacuum of 0.9 to 0.001 is applied to the vacuum vent.

A smooth, continuous product strand exists the extruder. The product does not require drying, and it can be further processed without intermediate steps. No ammonia vents into the environment, and all by-products are replaceable.

The product is poly(glutarimide), and is tested for thermal stability by the dynamic thermogravimetric analysis method (TGA) with results reported in Table 2.

B. To show the critical importance of the amine being non-aqueous and the subatmospheric pressure being applied to at least one vent port, a comparative experiment was conducted using the same conditions of A, supra, but using aqueous ammonia ($NH_3/H_2O$ ratio 80/20 by wt.) and plugging the vacuum vent. The product exited the extruder in foamed, discontinuous masses propelled by the ammonia pressure at high velocity and was stopped by a shield mounted about 4 feet from the extruder die. Large quantities of ammonia vented from the die into the environment. The product was ground to a fine powder and had to be dried. It was vacuum dried at 120° C. for 16 hours and tested for thermal stability by dynamic TGA. with the results reported in Table 2.

Although the products produced in accordance with the invention (A, supra) and in this comparative experiment, B, both had equal degrees of imidization (100%) and melt viscosity, the comparative experiment produced a product which was significantly less thermally stable than the analogous product of the invention. The results in Table 2 imply that at typical processing temperatures, around 300° C., product A only loses around 1% of its weight, whereas product B loses over 2%. This difference can mean the difference between a no bubble, smooth surfaced product and a bubble-containing, rough-surfaced product.

TABLE 2

THERMAL STABILITY
DYNAMIC TGA, TEMP. INCREASE RATE
20° C./min.

| % Weight Loss | Temp., °C., Air or Nitrogen, at which total wt. loss is as indicated | | | |
|---|---|---|---|---|
| | AIR | | NITROGEN | |
| | A | B | A | B |
| 1 | 285 | 100 | 300 | 105 |
| 2 | 370 | 175 | 400 | 275 |
| 3 | 385 | 350 | 440 | 385 |
| 4 | 395 | 380 | 420 | 405 |
| 5 | 400 | 390 | 420 | 410 |

NOTE:
A - represents invention
B - is comparative

EXAMPLE 53

This example compares the polymers prepared in Graves U.S. Pat. No. 2,146,209, Schröder et al U.S. Pat. No. 3,284,425 with the polymers of the invention.

A. GRAVES

The polymer prepared in Examples I and II of the Graves Patent are supposedly polymethacrylimides. However, according to these Examples the polymers actually produced were soluble in dilute ammonia and boiling methanol. The polyglutarimide polymers of the present invention are insoluble in dilute ammonia and insoluble in boiling methanol. The Graves product appears to be a copolymer of methacrylimide, methacrylamide, and ammonium methacrylate.

B. SCHRöder et al Autoclave

For purposes of comparison, Example 1 of U.S. Pat. No. 3,284,425 is repeated using 120 parts polymethyl methacrylate heated for 7 hours at 230° C. in a Parr stirred autoclave with 129 parts of a 33½% aqueous solution of methylamine and 780 parts water. A pressure of 31 atm. develops. The reaction product comprises a watery phase and 32.7 parts of a solid polymer which was washed and analyzed to have a nitrogen content of 8.5±0.2%. The 32.7 parts represents 34.6% of the initial charge.

The Schröder polymer is compared to the polymethylmethacrylate/methyl amine reaction product prepared in the extruder in accordance with the invention with the results reported in Table 3.

These data show that the Schröder et al polymer is clearly less thermally stable than the polymer prepared in accordance with the invention; the Schröder et al polymer exhibits weak, ill-defined glass transition temperature as compared to the polymer of the invention; and it begins to soften at a lower temperature (DTUFL and Vicat). The translucency of the Schröder et al material seems to indicate a non-uniform imide level, as compared to the transparent, and hence uniform, polymer of the invention. The difference in water resistance indicates inferior properties of the Schröder et al polymer.

EXAMPLE 54

Six and one-half parts of the poly(glutarimide) polymer produced in accordance with Example 18 are blended with three and one-half parts of the MBS impact modifier produced in accordance with Example 1 of U.S. Patent Application Ser. No. 588,544 of June 19, 1975 and 0.5 weight percent antioxidant at 460°–510° F. in a vacuum-vented single screw extruder to produce translucent strands which are then pelletized, dried at 90° C. and injection molded at extrusion temperatures. The polymer blend produced had a Vicat of 185° C., a DTUFL (°C.) of 180 (66 psi), 160 (264 psi), and 170 (264 psi annealed). The product had a notched Izod impact strength of 1.1 ft.-lbs./in. and tensile modulus of $4 \times 10^5$, tensile strength of $9 \times 10^3$ psi at break.

EXAMPLE 55

Compositions similar to that of Example 4 except using the impact modifier produced in accordance with Example 1 of U.S. Pat. No. 3,808,180 with imide to modifier ratios of 3/2 and 1/1 gave similar results. Substitution of MBS and ABS modifiers gave excellent balance of properties.

EXAMPLE 56

A composition as per Example 54, except with the ratio of poly(glutarimide) to MBS modifier of 6 parts to 4 parts, gave translucent articles having the following properties, Vicat 135° C.; DTUFL 120° C. (66 psi), 100° C. (264 psi); notched Izod 2.5 ft.-lbs./in.; tensile modulus $3 \times 10^5$ psi; tensile break strength $6 \times 10^3$ psi.

EXAMPLE 57

Example 54 was repeated except substituting one part of polycarbonate for one part polyglutarimide, producing opaque polymer blends having the following properties, Vicat 170° C.; DTUFL 170° C. (66 psi), 135° C. (264 psi), 145° C. (264 psi, annealed); notched Izod 2.1 ft. lbs./in.; tensile modulus $3 \times 10^5$ psi; tensile break strength $7 \times 10^3$ psi.

EXAMPLE 58

Example 54 was repeated except using 5.9 parts polyglutarimide to 4.1 parts impact modifier, and substituting for the MBS impact modifier one of the following formula: Bd/St//MMA//St//MMA/AN/St: 71/3//3//11//4/4/4.

The properties of the resultant blend were as follows: Vicat 160° C.; DTUFL 147° C. (66 psi), 140° C. (264 psi); notched Izod 1.5 ft.-lbs./in.; tensile modulus $3 \times 10^5$; tensile strength at break $8 \times 10^3$ psi.

TABLE 3

| TEST | AUTOCLAVE (SCHRÖDER) | EXTRUDER (INVENTION) |
|---|---|---|
| % Nitrogen, ± 0.2 | | |
| Intrinsic Viscosity | 8.5 | 8.3 |

TABLE 3-continued

| TEST | AUTOCLAVE (SCHRÖDER) | EXTRUDER (INVENTION) |
|---|---|---|
| Melt Rate Flow Condition C | 0.45 | 1.0 |
| In DMF | insoluble | 0.35 |
| In 95/5 DMF/Formic Acid | 0.24 | 0.20 |
| In tetrahydrofuran | insoluble | soluble |
| Vicat Temperature °C. | 170 | 177 |
| DTUFL by TMA °C. | 90 | 122 |
| Tensile Impact (avg. of 5 measurements with large amount of scatter and therefore low confidence value) | 20.7 | 13.4 |
| Tensile | | |
| Break strength, psi | 12,800 | 12,100 |
| Modulus, psi | 519,000 | 518,000 |
| After 35 hrs. in boiling water | | |
| % weight increase | 5.2 | 3.3 |
| surface condition | badly attacked | good |
| optical properties | opaque/white | clear/light yellow |
| Original Optical Properties | translucent/gray | clear/yellow |
| Differential Thermal Analysis (DTA) | | |
| Nature of Transition | weak ill defined | sharp well defined |
| Transition Temp., °C. | 194 | 179 |
| Thermogravometric Analysis (TGA) | | |
| 1% Wt. Loss (Air) °C. | 240 | 365 |
| 1% Wt. Loss (N₂) °C. | 245 | 395 |
| 3% Wt. Loss (Air) °C. | 360 | 395 |
| 3% Wt. Loss (N₂) °C. | 395 | 410 |
| Nuclear Magnetic Resonance Analysis, presence of signal at 3.14α indicating presence of at least 1% by weight amide groups | present | absent |

I claim:

1. Method for producing a polymer containing imide units comprising reacting under substantially anhydrous conditions in an extruder an acrylic polymer with ammonia or a primary amine at a temperature of about 200° to 450° C. while applying subatmospheric pressure to at least one vent port of said extruder.

2. Method of claim 1, wherein said anhydrous ammonia or primary amine is introduced through an extruder addition port at a pressure of about atmospheric to 1000 atmospheres.

3. Method of claim 1, wherein the average residence time is 0.1 to 1000 seconds.

4. Method of claim 1, wherein the degree of imidization is controlled by control of the average residence time and temperature.

5. Method of claim 1, wherein the temperature is about 300° to 375° C.

6. Method of claim 1, further characterized as being carried out in the absence of a solvent.

7. Method of claim 1, further characterized as carried out in the absence of a catalyst.

8. Method of claim 1, wherein anhydrous ammonia is introduced through an extruder addition port at a pressure of about atmospheric to 500 atmospheres, the average residence time is maintained at 30 to 300 seconds, a partial pressure of about 0.9 to 0.01 is applied to at least one vent port, the temperature is maintained at about 325° to 375° C., and the reaction is conducted in the absence of solvent.

9. Method of claim 1, wherein a partial pressure of about 0.9 to 0.01 atmospheres is applied to said vent port.

10. Composition comprising the polymer product containing imide units produced by the method of claim 1.

11. The composition of claim 10 in the form of a sheet, rod, tube, powder, granule, or molded article.

12. The composition of claim 10, wherein the polymer comprises a multiple stage polymer containing imide units in the outer stage of said multiple stage polymer.

13. The composition of claim 10, wherein the acrylic polymer is a blend of single stage and multiple stage polymers, and the polymer containing imide units is a blend of a single stage polymer and a multiple stage polymer containing imide units in the outer stage.

14. The composition of claim 13, wherein the multistage polymer containing imide units comprises about 10 to 60% by weight of the blend.

15. The composition of claim 10, wherein the polymer containing imide units has an intrinsic viscosity, [η] DMF, of about 0.01 to 7.0.

16. The composition of claim 10, wherein the polymer containing imide units further contains acrylic units and the numerical ratio of imide units to acrylic units is about 1:2 to about 9:1.

17. The composition of claim 10, wherein 95 to 100% of the polymer units are imide.

18. The composition of claim 10, wherein 1 to 35% of the polymer units are imide.

19. The composition of claim 10 further including an impact modifier.

20. The composition of claim 19, wherein impact modifier is a multiple stage polymer.

21. The composition of claim 20, wherein the impact modifier selected from the group consisting of MBS, ABS, and all acrylic.

22. Method of claim 1 wherein the ammonia or primary amine is introduced in the extruder barrel so that it contacts and mixes with the polymer as it moves forward through the reaction zone under pressure.

23. Method of claim 1 wherein the vapor stream of the ammonia or primary amine is added countercurrently to the polymer stream.

24. Compositions comprising a thermoplastic polymer having good thermal stability and melt flow properties containing at least 10% imide units of the structural formula

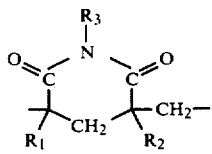

wherein $R^1$, $R^2$, and $R^3$ independently represent hydrogen or $C_1$ to $C_{20}$ unsubstituted or substituted alkyl, aryl, or mixtures thereof, said polymer being non-crosslinked and soluble in dimethyl formamide, and having a degree of thermal stability as measured by TGA in an air atmosphere wherein the temperature at which said polymer has a 1% decomposition of at least 285° C.

25. The composition of claim 24 further including an impact modifier.

26. The composition of claim 25, wherein said impact modifier is a multiple stage polymer.

27. The composition of claim 26, wherein the impact modifier is selected from the group consisting of MBS, ABS, and all acrylic.

28. The composition of claim 24 wherein the thermoplastic polymer is a multiple stage polymer containing units of said structural formula in the outer stage.

29. The composition of claim 24 comprising a blend of a single stage thermoplastic polymer containing imide units of said structural formula and a multiple stage polymer containing imide units of said structural formula in the outer stage.

30. The composition of claim 29, wherein the multi-stage polymer comprises about 10 to 60% by weight of the blend.

31. The composition of claim 24, wherein said thermoplastic polymer further includes units from other ethylenically unsaturated monomers.

32. The composition of claim 24, wherein said thermoplastic polymer has an intrinsic viscosity, $[\eta]_{DMF}$, of about 0.1 to 7.0.

33. The composition of claim 24, further characterized as soluble in tetrahydrofuran and dimethyl sulfoxide.

34. The composition of claim 24, in the form of sheet, rod, tube, powder, granule or molded article.

35. The composition of claim 24, wherein the polymer containing imide units further contain acrylic units and the numerical ratio of imide units to acrylic units is about 1:2 to about 9:1.

36. The composition of claim 24, wherein 95% to 100% of the polymer units are imide.

37. The composition of claim 24, wherein 10 to 35% of the polymer units are imide.

38. Composition of claim 24 wherein said degree of thermal stability is at least about 365° C.

39. Composition of claim 24 wherein said polymer is the reaction product of ammonia or a primary amine with an acrylic polymer containing units derived from esters of acrylic acid or methacrylic acid.

40. Composition of claim 39 wherein said degree of thermal stability is at least about 365° C.

* * * * *